June 18, 1940.   T. B. TYLER   2,204,919
AUTOMATIC TRANSMISSION
Filed July 1, 1938   10 Sheets-Sheet 1

INVENTOR.
TRACY BROOKS TYLER
BY
ATTORNEYS

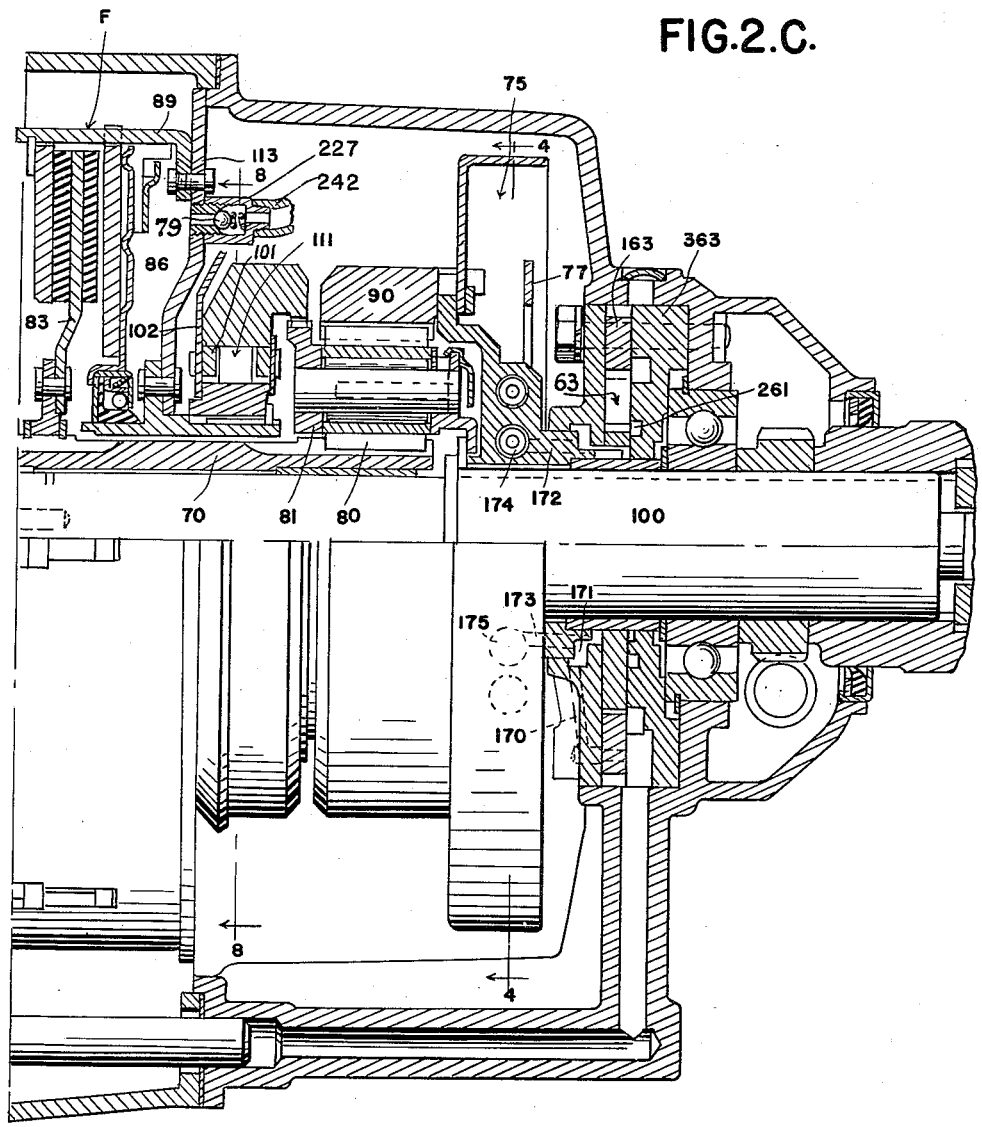
FIG.2.C.

June 18, 1940.   T. B. TYLER   2,204,919
AUTOMATIC TRANSMISSION
Filed July 1, 1938   10 Sheets-Sheet 5

INVENTOR.
TRACY BROOKS TYLER
BY
ATTORNEYS

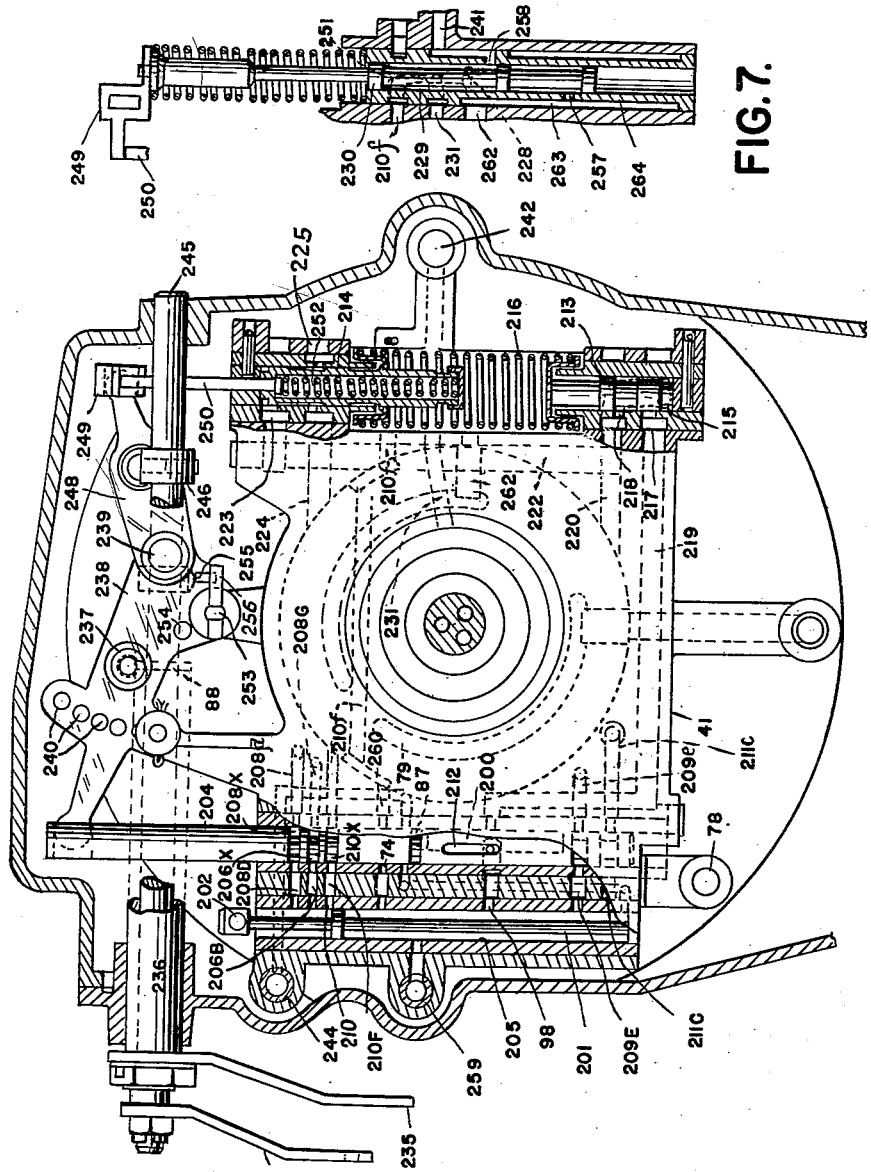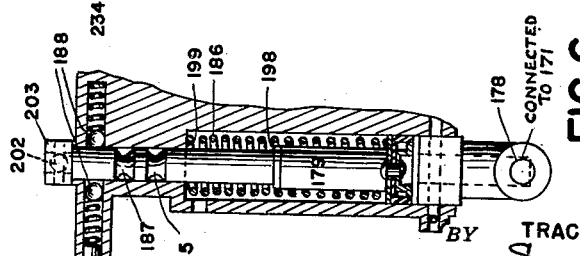

June 18, 1940.  T. B. TYLER  2,204,919
AUTOMATIC TRANSMISSION
Filed July 1, 1938  10 Sheets-Sheet 7

INVENTOR
TRACY BROOKS TYLER
BY
ATTORNEYS

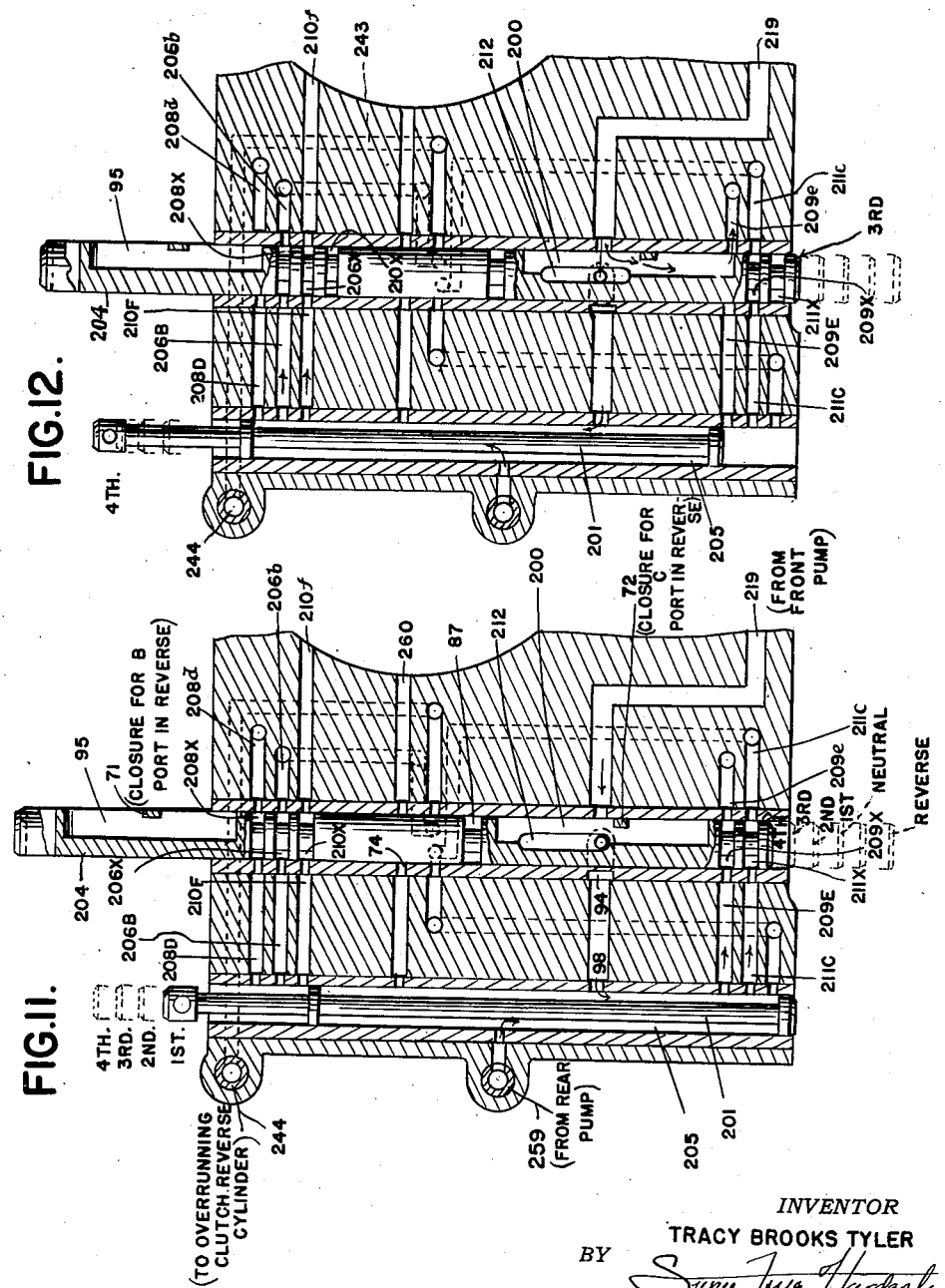

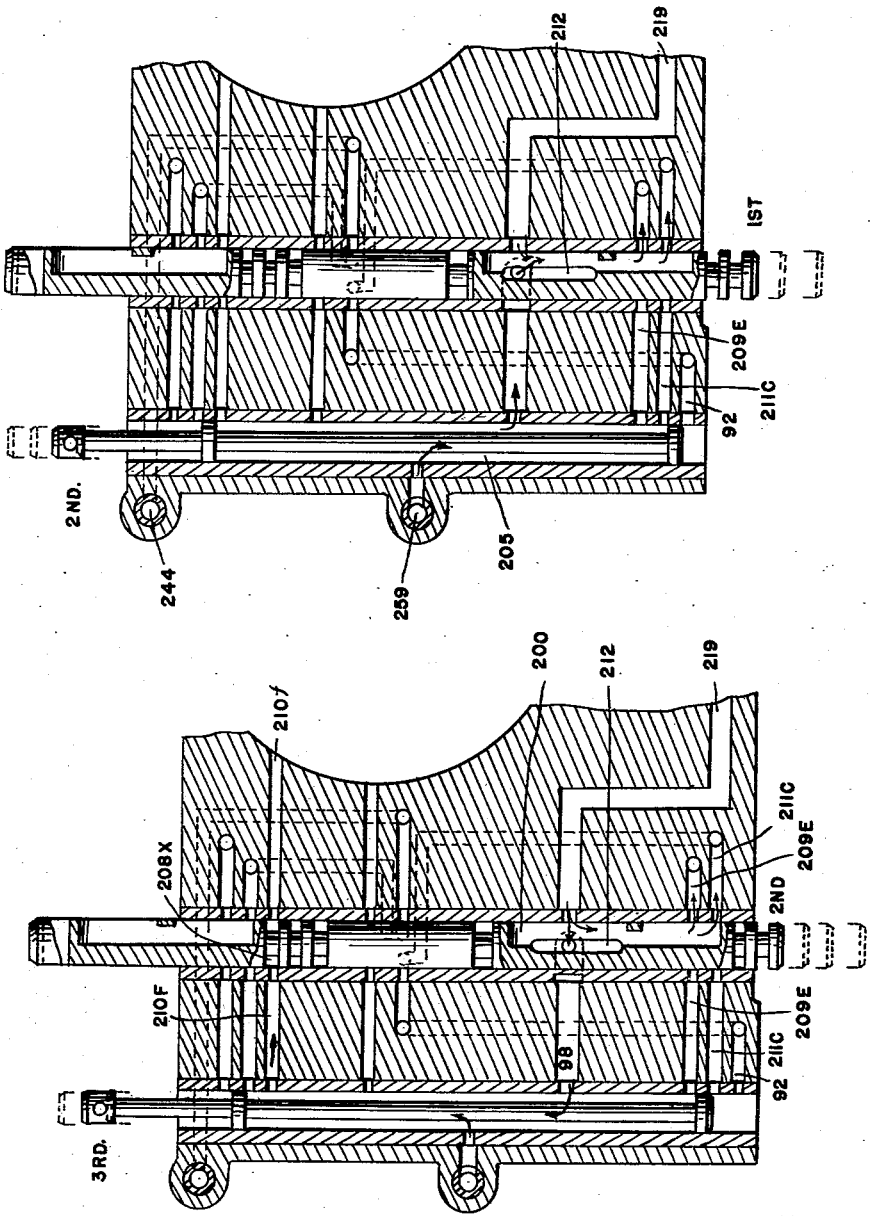

June 18, 1940. T. B. TYLER 2,204,919
AUTOMATIC TRANSMISSION
Filed July 1, 1938 10 Sheets-Sheet 10
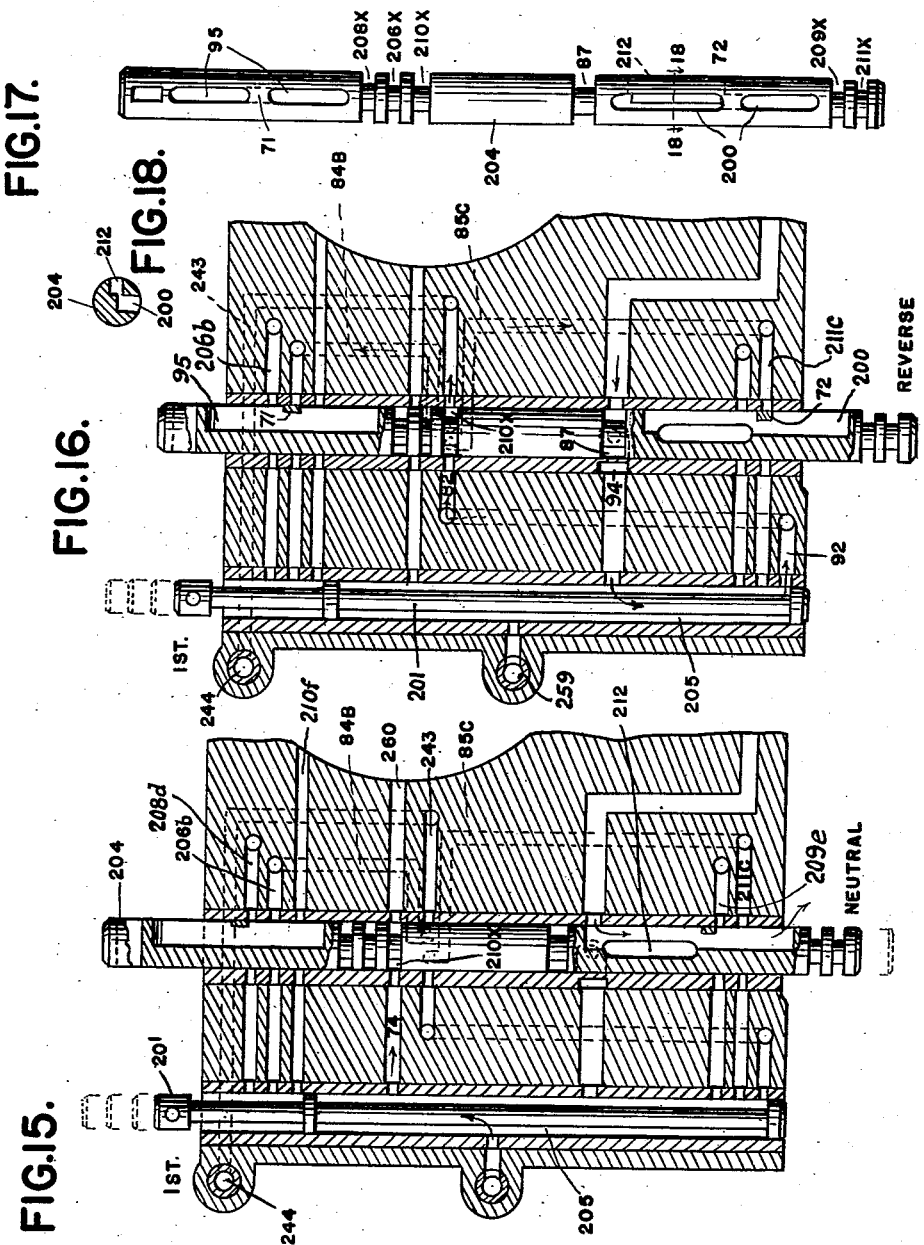
INVENTOR
TRACY BROOKS TYLER
BY
ATTORNEYS Patented June 18, 1940

2,204,919

UNITED STATES PATENT OFFICE 2,204,919

AUTOMATIC TRANSMISSION

Tracy Brooks Tyler, Chicago, Ill., assignor to The Monopower Corporation, Detroit, Mich., a corporation of Michigan Application July 1, 1938, Serial No. 216,983

24 Claims. (Cl. 74—260)

This invention relates to automatic power transmission mechanisms, for interconnecting shafts, or other driving and driven apparatus, in such manner as to enable changing the torque and speed ratios therebetween. An important aim of the invention is to provide improved means whereby such ratio changes may be effected either automatically, semi-automatically, or under the direct supervision of the operator, as he may desire. A further object of the invention is to provide such a transmission mechanism which is especially suitable for use in automotive vehicles, which enables the convenient incorporation of four forward speeds including an over-drive, and which provides for continuous application of power (acceleration), through all forward speeds.

Still another object comprises the provision of such an improved automatic transmission provided with conveniently operable overcontrolling means by which the operator may supervise or eliminate the automatic action, yet which is completely fool-proof in its operation, to such extent that by means of such manual overcontrol the transmission may be shifted to any gear ratio, either forward or reverse, while the vehicle is in motion or at rest, without any possibility of clashing or injury of any portion of the mechanism. A related object is the provision of such a transmission so designed that even though the manual overcontrol is thrown into reverse while the car is traveling forward at full speed, no harm will result, and no reverse action will occur until the car speed drops below a predetermined rate, such for example, as three to five miles per hour.

A further object is the incorporation in such a transmission of an improved, automatic, centrifugally controlled fluid actuated main clutch, which is instantaneously releasable regardless of viscosity changes of the operating fluid. A related object is to provide such a clutch which is also manually operable if the operator so desires, in the conventional or any desired manner, as by means of a small button or a clutch pedal of the usual variety.

An additional object is to provide such an automatic transmission and clutch assembly of extremely inexpensive and simple construction, and several of the principal parts of which are substantial duplicates of each other, while many are identical stampings.

Still another object comprises the incorporation of improved means, requiring no additional or special parts, which functions to prevent unwanted reversal of the driven shaft, and thereby to prevent a vehicle from backing down a hill while in forward gear, or from rolling forwardly down a hill while in reverse gear.

Other objects include the provision of such a transmission wherein no sliding splines or clutch or gear teeth need be engaged or disengaged, and which is so arranged that all parts operated or affected by oil pressure are within the housing, and all possibility of slight pressure fluid leaks to the outside are eliminated.

Still another object comprises the incorporation in such an automatic transmission of improved and simplified means whereby the engine of a vehicle may be cranked by towing or pushing, and whereby the cranking connection between the rear wheels and the engine is not effected until the car reaches a predetermined speed.

Other objects and advantages will be apparent from the following description wherein reference is made to the accompanying drawings illustrating a preferred embodiment of my invention and wherein similar reference numerals designate similar parts throughout the several views:

In the drawings:

Figure 1 is a composite view, partly in central longitudinal section and partly in side elevation, with the housing broken away, showing a preferred form of the invention.

Figures 2—A, 2—B, and 2—C are views showing respectively the left-hand, central and right hand portions of the transmission as shown in Figure 1, but upon an enlarged scale.

Figures 3, 4 and 5 are cross-sectional views taken substantially on the lines 3—3, 4—4 and 5—5, respectively, and looking in the direction of the arrows.

Figure 6 is a sectional view of the automatic valve actuating plunger.

Figure 7—A is an enlarged detail of such valve, partly in section and partly in elevation.

Figure 2A:
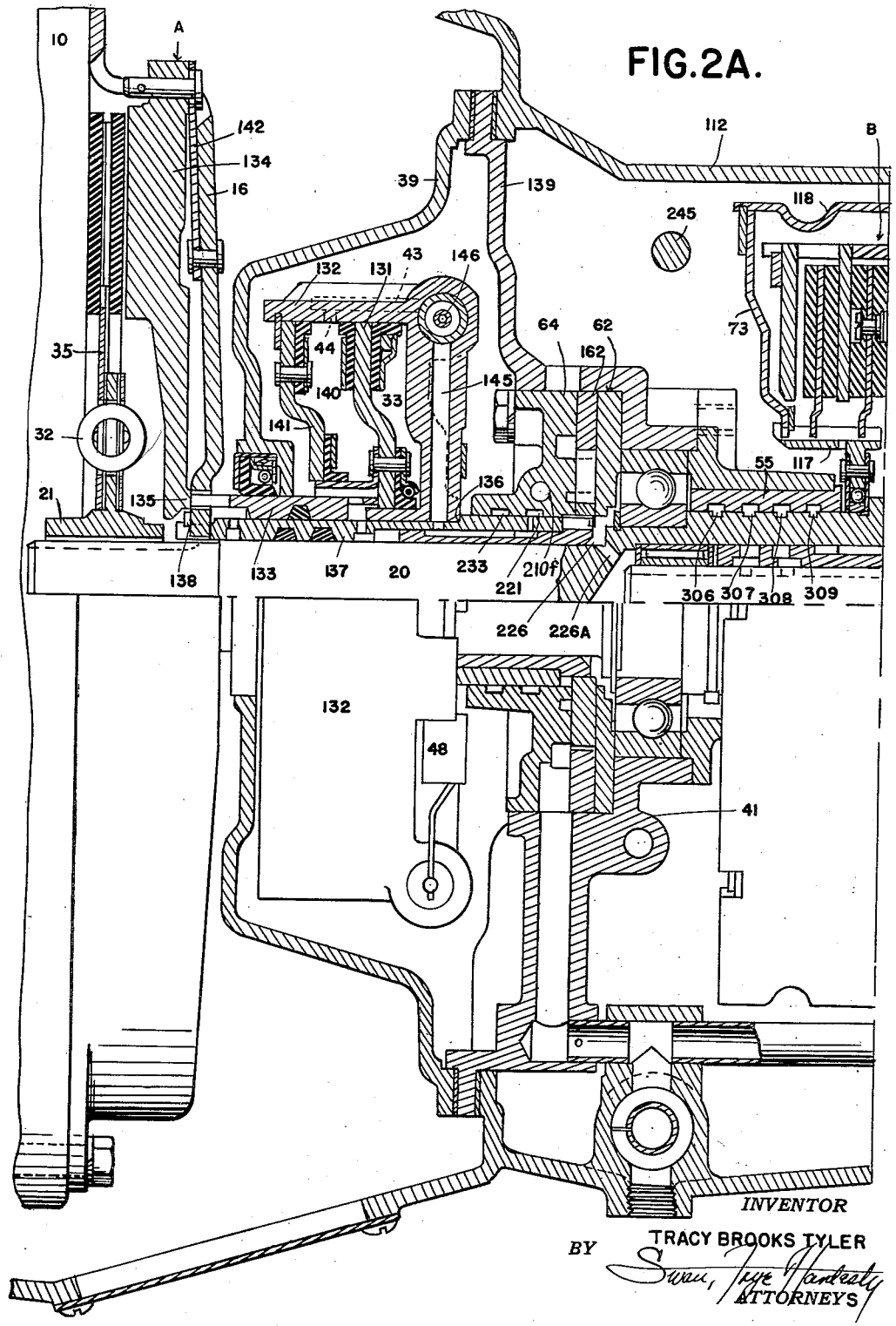
Figure 2B:
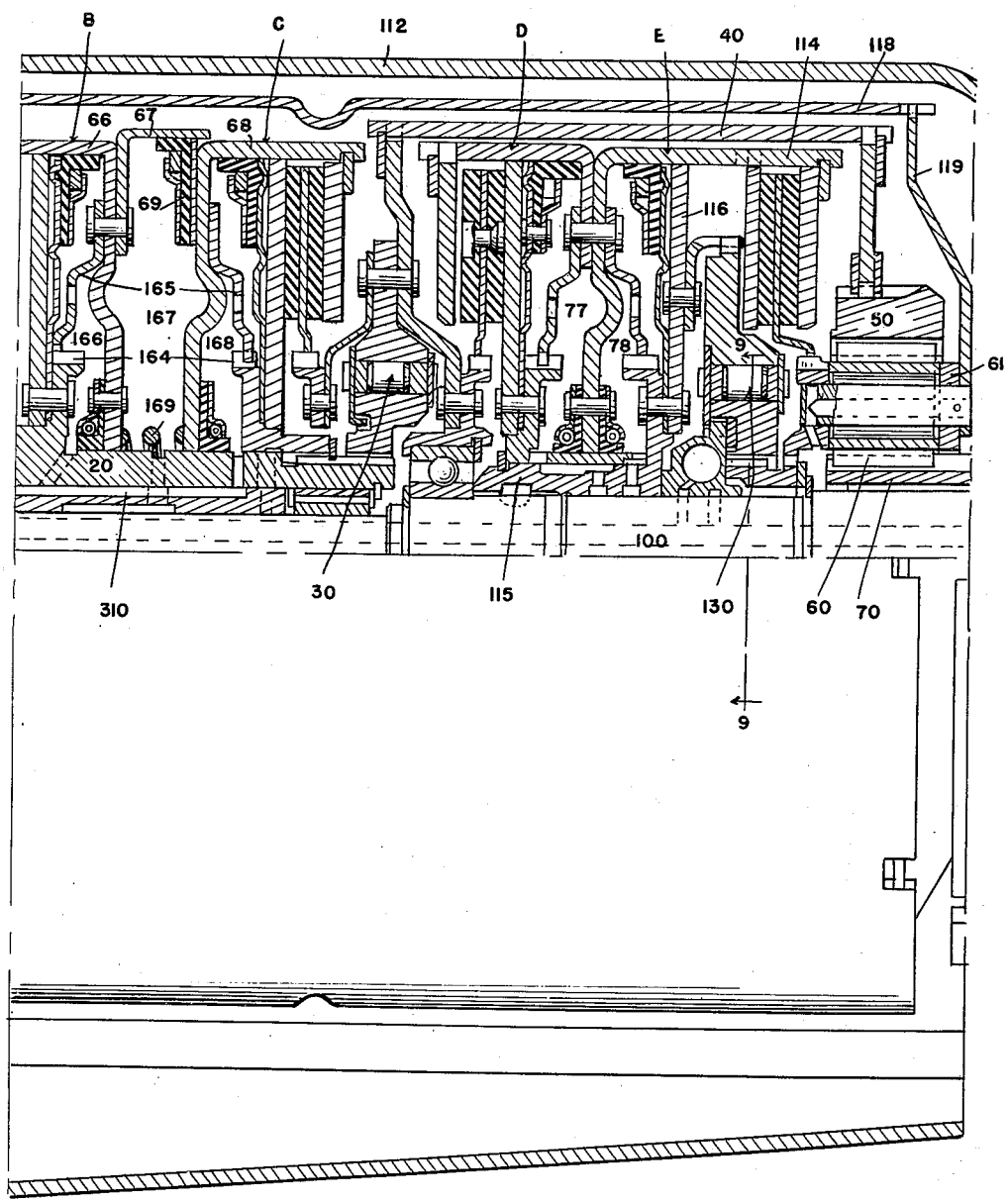
Figure 8:
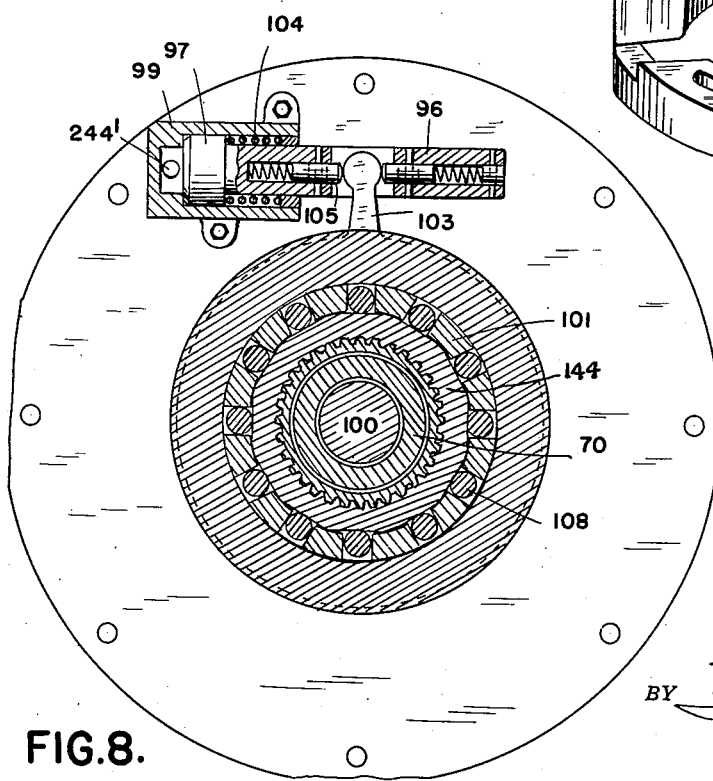

Figure 8 is a sectional detail taken substantially on the line 8—8 of Figure 2—C, and looking in the direction of the arrows.

Figure 9:
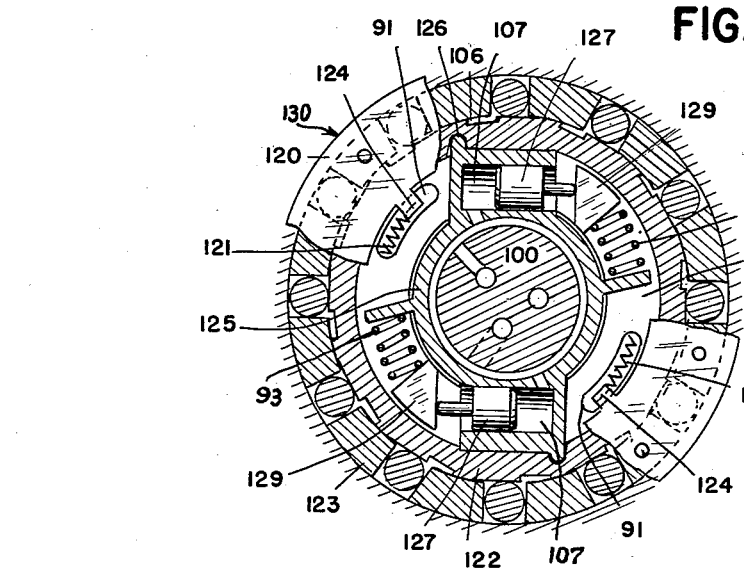

Figure 9 is a sectional detail taken substantially on the line 9—9 of Figure 2—B, and looking in the direction of the arrows.

Figure 10:
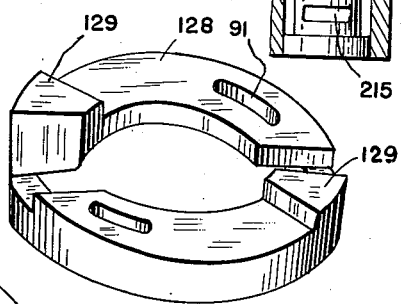

Figure 10 is a detail perspective view of one of the elements of the disengaging mechanism of an overrunning clutch.

Figure 11 is a diagrammatic sectional view of the cooperative automatic valve mechanism and manually operable overcontrol valve, showing the valves in positions they normally occupy when the vehicle is at rest.

Figures 12, 13, 14, 15 and 16 are similar schematic views showing positions assumed by the valve during operation of the transmission;

Figure 17 is a side view of the manually operable overcontrol valve.

Figure 18 is a detailed cross sectional view taken substantially on the line 18—18 of Figure 17, and looking in the direction of the arrows.

Figure 1:
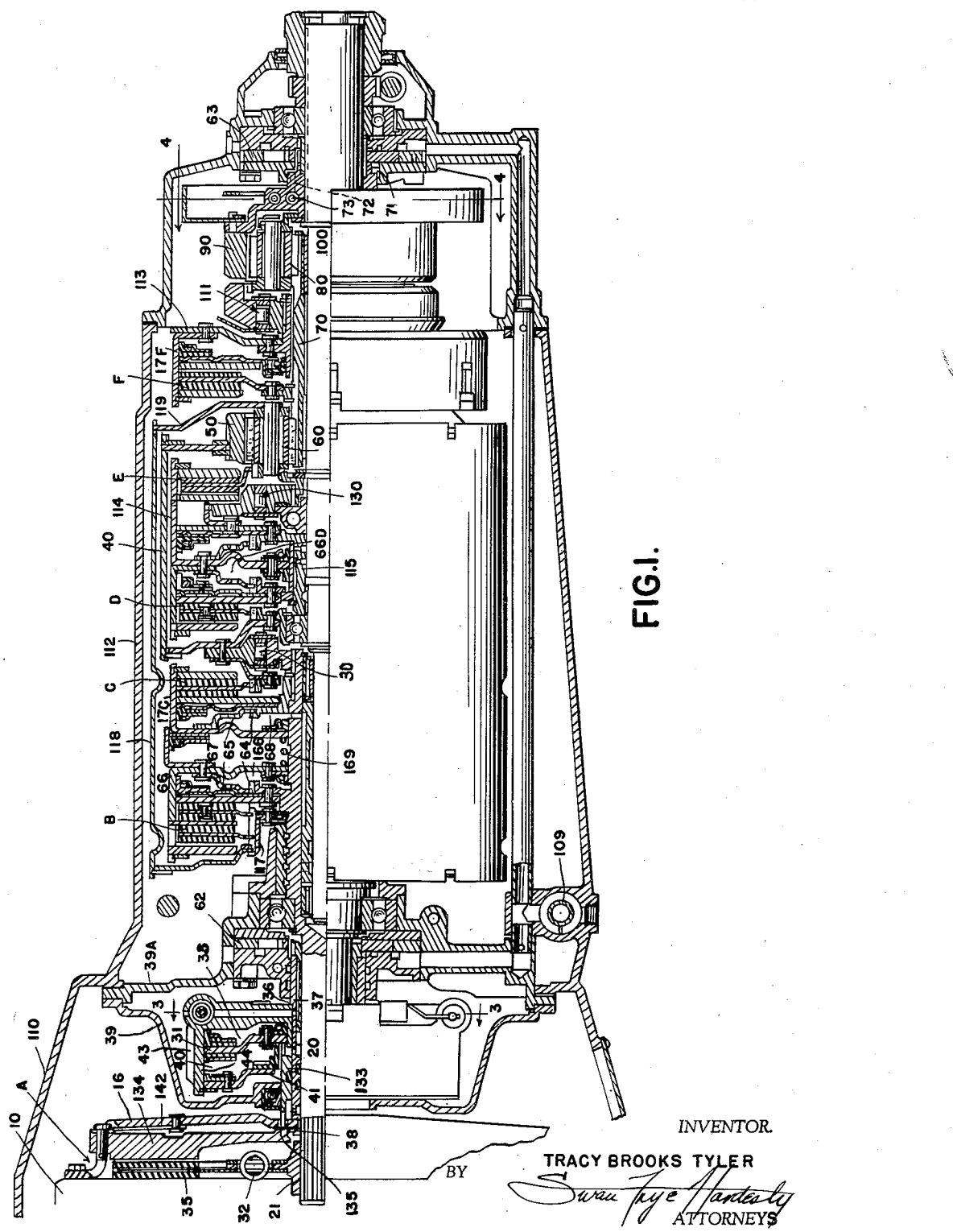

As best shown in Figure 1, the transmission mechanism is housed in a casing 112 forming a rearward extension of a clutch housing 110, within which is arranged a main clutch drivable by a flywheel 10 from an engine or other suitable source of power. Although the illustrated main clutch, generally designated "A", is of a novel design, operating upon principles disclosed in my copending application Serial No. 206,955, filed May 9, 1938, the use of a clutch of this type is not essential.

*General arrangement and operation of torque-transmitting parts*

Before describing the detailed structural features of the mechanism, and its controlling means, the general arrangement of the gears and clutches, and the manner in which they function to transmit the drive at different ratios, will be set forth. This will afford a general understanding of the entire construction which, it is believed, will be helpful in understanding the significance of the individual features of the apparatus.

The main clutch, generally designated A, is of the friction type and is centrifugally controlled in response to the speed of the driving element 10, which is shown as a flywheel, rotatable by an engine (unshown). When the speed of the flywheel rises to a predetermined rate, this clutch engages (gradually, by means presently to be described) to connect the transmission shaft 20 to the flywheel and engine. Additional fluid operable friction disc clutches, generally designated B, C, D, E, and a brake F, are grouped concentrically along the transmission shaft 20 and driven shaft 100. The clutches B, C, D and E are arranged generally in the central portion of the casing, while the gearing, comprising two sets of planetary gears, each surrounded by an internally toothed ring gear with which the planet gears mesh, is located at the rear, or right end of the assembly as shown in the drawings, one of such two gear assemblies being disposed upon each side of the brake F, the general construction of which is similar to that of clutches B, C, D, and E.

Referring to Figure 1, and to Figures 2—A, 2—B and 2—C, which are adapted to be considered as juxtaposed in the order named to afford an enlarged view, a first speed (high torque) drive is provided when only clutches A, C and E are engaged, and may be traced from the flywheel or driving element 10 through clutch A to transmission shaft 20, then through overrunning clutch 30 (which is locked out by engagement of clutch C, although this is not essential) to a sleeve 40, which, in the form of a drum, encloses clutches D and E. Drum 40 drives ring gear 50 of the first planetary gear assembly, and thereby tends to roll the planetary gears 60 upon the sun-gear 70. The sun gear 70 is in the form of a sleeve freely rotatable upon the driven shaft 100 and toothed at both ends, forming, as shown, the sun gear for both planetary systems. The cage or spider 61 by which planet gears 60 are carried is directly connected to the driven shaft through overrunning clutch 130, plate 116, drum 114 and hub 115, the latter splined to the driven shaft 100. The engagement of clutch E also provides direct connection between the gear cage 61 and drum 114. Due to the resistance of the load, planet gears 60 tend also to rotate sun gear 70 in the reverse direction, and such force tends to rotate planet gears 80 of the other planetary set about their individual axes, since the cage 81 by which planet gears 80 are carried is held against rotation by the overrunning clutch 111. Rotation of planet gears 80 tends to drive the internal toothed ring gear 90 meshing therewith in the forward direction, gear 90 being also directly keyed to the driven shaft. Due to the load thus transmitted back through gears 90 and 80 to sun gear 70, the latter is allowed to rotate at a reduced rate in the opposite direction as the planetary gears 60 roll thereover at a reduced speed. The combined action of the two gear assemblies thus provides a reduced or first speed drive.

In forward speeds, clutches C and E merely act to prevent overrunning of the overrunning clutches 30 and 130, whenever they are being used in the line of drive. It is not necessary that clutches C and E be engaged as described in the first speed condition, however, as the vehicle will coast anyway because of the presence of overrunning clutch 111.

When the second speed drive is in operation, only clutches A, C, E and brake F, are engaged. The drive is then, as in first speed, through overrunning clutch 30, sleeve 40 and gears 50 and 60 to sun gear 70, but brake F rigidly holds the sun gear against rotation with respect to the casing, so that the planetary gears 60 roll freely on the sun gear and the drive is transmitted to shaft 100 only through the cage 61 of these planetary gears, and through drum housing 114 and hub 115 to the driven shaft. Overrunning clutch 111 allows planetary gears 80 to roll freely upon sun gear 70.

A third speed drive constituting a direct drive between the flywheel and driven shaft is effective when only clutches A, B, E and brake F are engaged. The drive is then from shaft 20 through clutch B to its hub 117, which is journaled for free rotation upon shaft 20 and connected through a web 73 to a drum 118, which encircles both drums 40 and 114 and encloses clutches B, C, D and E. Drum 118 is connected by means of its opposite end web 119 to the cage 61 of planet gears 60. Such cage, as previously stated, is directly connected to the driven shaft through overrunning clutch 130. Since the sun gear 70 is still held stationary by engagement of brake F, the cage 61 rotates at the speed of the driven shaft and a direct drive effect is secured. The ring gear 50 drives sleeve 40 in the same direction at an increased rate of speed, such sleeve overrunning on overrunning clutch 30. Clutch E prevents overrunning through overrunning clutch 130.

An over-drive fourth speed is provided when only clutches A, B, D and brake F are engaged. The drive is through the same elements up to the planet gears 60. From these the drive is now transmitted to the ring gear 50, which drives the driven shaft at an increased speed ratio through clutch D and its hub 115 which, as stated, is keyed to the driven shaft. Clutch E then being released, overrunning clutch 130 overruns, and sun gear 70 being held stationary, the drive from the planet gears 60 rotates the ring gear 50 at the proper speed for over-drive.

For reverse drive, only clutches A, B and C are engaged, while by means presently to be described, the action of overrunning clutch 111 is reversed. Overrunning clutch 130 is completely freed at this time, by additional mechanism presently to be described, allowing independent rotation of its inner and outer races. Simultaneous engagement of clutches B and C is equivalent to locking together planet gears 60 and ring gear 50, since clutch B locks the driving shaft to the cage of planet gears 60 through its hub 117 and drum 118, while clutch C locks the driving shaft to the ring gear 50 through drum 40. In this condition, the sun gear 70 becomes unitary with the planet set 50—60 and rotates planet gears 80 in the reverse direction. Since, as stated, overrunning clutch 111, during reverse operation, prevents reverse rotation of the cage of planet gears 80, their axes are held stationary and a reverse drive is transmitted through them and through ring gear 90 to drive shaft 100.

*Main clutch construction and operation*

Referring to Figure 2—A, the clutch disc 35, and pressure plate 134 of the main clutch will be seen to be enclosed within a cover plate 16 bolted at its periphery to the flywheel. The pressure plate is suspended upon radially disposed flat spring elements 142 secured at their inner ends to the cover plate 16 and at their outer ends to the pressure plate, these springs urging the pressure plate toward released position and holding it against radial movement with relation to the cover. When the pressure plate is forced toward the flywheel, to clamp the clutch disc 35, the latter transmits the drive to the hub 21 by which it is carried, through cushion springs 32. The hub is keyed to the shaft 20.

To apply pressure to the pressure plate to engage the clutch in the manner described, pressure fluid is admitted, in a manner which will presently be described, to a chamber 33 behind a piston 131 in a cylinder 132, all of these parts being disposed concentrically with the axis of the assembly, as are the other parts to be described. The piston abuts a slidable sleeve 133, which in turn abuts the pressure plate 134, projecting into engagement therewith through openings (undesignated) in the cover plate 16. Movement of the piston due to pressure in the chamber 33 may thus move the pressure plate to engage the clutch. The reaction of the force developed is taken against a shoulder 136 on a sleeve 137, which sleeve is fixed by means of a snap ring 138 to the cover plate 16 of the main clutch. The pressure therefore exerts no thrust against the flywheel bearing, or the transmission bearing, as the pull comes against the snap ring 138 and the thrust against the clutch pressure plate at its abutment 135 (through which the pressure plate is actuated). This will be seen to tie the clutch actuating cylinder to the clutch and its cover as a unit, although the actuating cylinder will be seen to be enclosed within the transmission housing and separated from the main clutch by a cover portion 39 secured to the casing assembly 110—112.

The sleeve 137 is also splined to the clutch cover plate 16 and accordingly it, together with the cylinder 132 and all its component parts, revolves with the flywheel.

Upon the opposite side of piston 131 is a chamber 140 formed by a plate 141 sealed at its inner and outer peripheries. Fluid seeping past the piston keeps chamber 140 filled at all times. The purpose of this is to balance off centrifugally the effect of the forces so generated by the fluid in the chamber 33 when the cylinder 132 is revolved at high speed by the engine, without the engagement of the main clutch being desired. Without this provision centrifugal pressure generated in chamber 33 would urge the piston 131 to the left to apply pressure to plate 134 without control. When fluid pressure is shut off from chamber 33, it is shunted to the chamber 140 through a conduit 43 and port 44. This, and the peripheral positioning of the vents of chamber 33, provides for instant release of the clutch, even though the fluid may be thickened by low temperatures in cold weather.

Figure 3:
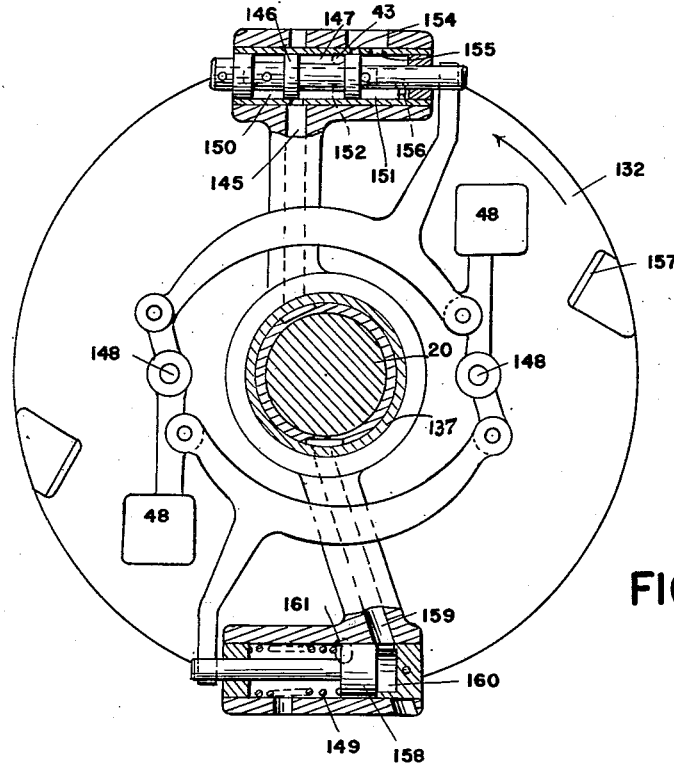

In Figure 3 is shown the means by which the main clutch is centrifugally operated in conjunction with mechanical fluid pressure.

At all times when the engine is running, fluid pressure is supplied, by means presently to be described, to a conduit 145. The entire unit shown on the drawings, being carried by the cylinder body 132 within the compartment defined by partitions 39, 139, revolves with the flywheel. Flyweights 48 pivoted as at 148 upon the casing 132 are urged outwardly by centrifugal force and inwardly by fluid pressure, assisted by spring 149.

The parts are shown in clutch released position, in which a sliding valve 146 is in such position that the fluid is admitted only to valve chamber 147, and from it into conduit 43, which as shown in Figure 2—A, is connected to the clutch releasing chamber 140, the result being the positive maintenance of the clutch in released position.

When the assembly revolves at sufficiently high speed so that forces of the centrifugal weights 48 overcome the tension of spring 149, the valve 146 begins to move toward the right until chamber 150 comes partially into registry with the conduit 145. Through an axial bore 152 in the valve, the pressure fluid is conducted from chamber 150 to chamber 151. During this movement the pressure fluid escapes from conduit 43 through an escape port 154, thereby venting clutch chamber 140. The pressure fluid attempts to escape from chamber 151 through a second escape port 155, and if the speed of rotation is not great enough to generate sufficient centrifugal force from the weights 48, the fluid does escape without building up any pressure in the chamber 151. If the rotational speed be gradually increased from this point, the valve in conjunction with outlet 155 will act in the manner of a spring-urged relief valve, and will attempt to close off port 155 with increasing force, thereby gradually building up the pressure in the chamber 151, and hence in the piston chamber 33, which is connected thereto by a passage 156. Hence in the chamber 33 the fluid pressure corresponds to the centrifugal force, at the different speeds, until a predetermined maximum pressure has been obtained. Such predetermined maximum is delimited by a relief valve provided in another part of the system and presently to be described. After a predetermined maximum speed of rotation has been attained, the flyweights 48 are stopped by engagement with lugs 157, port 155 being then fully closed.

Another valve 158, also controlled by the flyweights and related elements is arranged to maintain engagement of the clutch A whenever the transmission is in second speed or higher. This valve also causes engagement of the main clutch in such manner as to allow starting the engine of the motor vehicle by towing. Fluid-induced operation of this valve is provided through a conduit 159, which communicates with the fluid pressure supply source from chamber 205 (Figures 5 and 11-16 inclusive), through ports 210, 210f, 228, when the main control valve 201 of the transmission is shifted to second speed position or higher. The operation of the control valve will presently be described. When fluid pressure is thus introduced into chamber 160, valve 158 is moved all the way to the left, which moves the flyweights fully outwardly and valve 146 all the way to the right. A port 161 also communicates with the valve chamber 160 when valve 158 is at the left end of its movement. Port 161 communicates with clutch actuating chamber 33, although port 161 is not opened to provide such communication until after escape port 155 of valve 146 has been fully closed. This arrangement will be seen to maintain the main clutch A in engagement whenever the transmission is in second speed ratio or higher.

*Fluid pumping system*

The transmission is equipped with two fluid pumps, 62 and 63. The pump 62, near the front end of the transmission, is driven only by the engine, its rotor 162 being splined to the sleeve 137. The rear pump 63 has its rotor 163 splined to the hub of the governor 75 (presently to be described), which is splined to the driven shaft 100. As shown in Figure 1 both pumps may draw their supply through a common screen 109, from the sump of casing 112.

*General features of transmission clutches*

In view of the fact that transmission clutches B, C, D, and E and their component fluid pressure chambers are, at various times, revolved at relatively high speeds, it is necessary that the effect of the fluid in the pressure chambers be counteracted at all times, while the drums are revolving. This is achieved in a novel manner which involves moving the external drums or cylinders axially to engage and disengage the clutches, rather than moving piston plates or the like with relation to the cylinders. The piston plate element of each clutch is fixed to the driving hub or supporting shaft, while the surrounding cylinder portion is slidably splined to the hub sleeve or shaft, as indicated at 164, by means of plates, as 165.

For the clutches B and C, three fluid pressure chambers 166, 167, and 168 are provided. Fluid is admitted to the central chamber 167 under just enough pressure to keep it full, while fluid under full clutch operating pressure may be admitted to either of the chambers 166, 168. It will be seen that such full fluid pressure, when admitted to chamber 166, tends to move the drum 66 of clutch B to the right to apply that clutch, while likewise admission of such full fluid pressure to chamber 168 tends to apply clutch C by moving its drum-shaped casing 68 to the left as viewed in the figures. When both clutches B and C are disengaged and rotating at high speed, the centrifugal force of any fluid in chambers 166 and 168 which might tend to cause their engagement is offset by a similar force in the chamber 167, which tends to spread the cylinders 66, 68 apart toward disengaged position. Chamber 167 is enclosed by a sleeve 67 secured to one of the cylinders as 66, and in substantially sealed slidable engagement with the other cylinder 68, which carries packing means 69 to cooperate with sleeve 67.

In addition to the centrifugal balance provided by central chamber 167, a coiled retractor spring 169 normally maintains the clutches in their released positions. When fluid under mechanical operating pressure is admitted to either one or both of the chambers 166, 168, the only deduction from the total pressure will be that of spring 169, since the centrifugal forces are balanced and independent of the mechanical pressure under all conditions.

Since the clutches D and E are never engaged simultaneously, no extra balancing chamber is necessary. When fluid pressure enters one of the pressure chambers, as chamber 77 of clutch D, it is ejected from the other pressure chamber, as chamber 78 of clutch E, and vice versa.

The cylinders of these clutches move as a unit, and form the drum assembly 14. When this assembly is moved in one direction it applies one clutch and releases the other and vice versa, so that the fluid pressure which engages one clutch positively disengages the other, insuring instant release whenever the other is engaged.

Brake F requires no centrifugal balancing since only its friction plate 83 rotates relatively to the housing, its drum 89 being bolted directly to a web 113 which in turn is fixed to the casing.

*Governor and valve means for automatically controlled actuation of transmission clutches*

Figure 4:
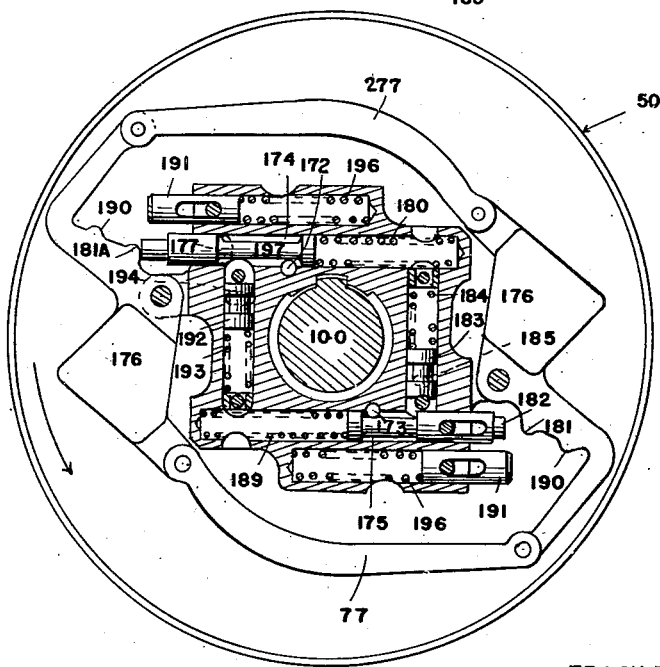

Actuation of the transmission clutches is controlled automatically through the cooperative action of a governor, best shown in Figure 4, and automatically regulated valve means shown in that view and in Figures 5, 6, and 7.

From the output of rear fluid pressure pump 63, (Figure 2—C) a conduit bore 170 conducts fluid to a chamber 171, and thence through ports 172, 173 to valve chambers 174 and 175 (Figure 4).

The entire assembly shown in Figure 4 rotates with the driven shaft 100, and at low speeds its flyweights 176 remain in their indrawn positions in which they are shown. The pressure fluid from port 172 then passes freely out of the valve chamber 174 through an escape port 177.

A conduit (not shown) connects the distribution chamber 171 with inlet port 178 of a piston plunger 179 (Figure 6) which actuates the main automatic valve 201, being mechanically connected thereto by a rod 202 which connects their projecting head portions. The plunger and valve lie parallel and adjacent to one another at a point near the front of the transmission, the plunger being shown separately in Figure 6.

Upon increase of the rotational speed of the governor, the tension of spring 180 is overcome sufficiently so that the flyweights, which are articulated as by links 277 for simultaneous movement, move outwardly until the lug 181 of the right hand flyweight arm, as shown in Figure 4, engages and is stopped by the end of valve plunger 182. The port 177 is simultaneously closed by a similar lug 181—A carried by the left hand flyweight arm, which moves valve 197 to the right sufficiently for this purpose. An initial predetermined fluid pressure is thereby created, which is delimited by a spring held relief valve 183 which the fluid, entering through port 173, must depress against its spring 184 to escape through the port 185. Assuming some predetermined fluid pressure, such as, for example, 20 pounds to the square inch, is thus created in the system, the spring 186 of the plunger 179 is thereby compressed to a point where it equals 20 pounds per square inch, and at this point a recess 187 in the plunger becomes aligned with spring pressed detent balls 188. The detent balls are provided to properly register the plunger at this point, even though some variation from the predetermined fluid pressure might be required to maintain the exact position.

With further increase in the rotational speed of the governor, and correspondingly further outward movement of the flyweights, the spring 189 of the valve plunger 182 is compressed, and the spring 180 further compressed until the outer lugs 190 of the flyweight arms come in contact with and are stopped by the spring projected plungers 191. In this condition the chamber of valve 183 has been closed off, by this further movement of the valve plunger 182, whereupon the fluid can no longer escape through port 185, and the pressure in the system is increased to the pressure required for the fluid entering the valve assembly through port 172 to move the relief valve 192 against the resistance of its heavier spring 193 and escape through the escape port 194 thereof. It may be assumed that this valve establishes a higher pressure, such for example, as 40 pounds to the square inch.

With this amount of pressure in the system, the spring 186 of the valve operating plunger 179 is further compressed to the point where its tension is equal to 40 pounds per square inch, at which point the recess 195 is arranged to come into registry with the spring detent balls 188.

At a still higher governor speed, the springs 196 of the plungers 191 are overcome, and springs 180 and 189 are also further compressed, whereupon the chamber of the relief valve 192 becomes closed by the valve plunger 197, thereby closing the last escape port and bringing the pressure in the valve actuating system up to the maximum pressure, which may be determined by a main relief valve (not shown) connected to the rear pump. Assuming this to create some such increased pressure as for example 60 pounds to the square inch, the spring 186 is thereby compressed until the shoulder 198 of the plunger strikes a shoulder 199 provided by the top of the spring well. It will be seen that the plunger 179 is in this manner moved to four different positions. When the flyweights of the governor have completed their outward movements in the order described, they strike and are stopped by the rim of the governor housing. This relieves the mechanism from strains due to extra centrifugal force.

The valve actuating plunger 179 is connected to the automatic control valve 201 by a stem or rod 202 attached to a collar 203 carried by the projecting end of the plunger. Movement of the plunger is thereby transferred to the valve 201 in accordance with the predetermined speeds of the vehicle.

Adjacent and in series with the automatic valve 201 is also arranged a manually shiftable valve plunger 204 arranged to overcontrol the automatic speed-selective action of valve 201, in a manner presently to be described. Fluid at the pressure predetermined by the relief valve 213 of the front pump and the similar relief valve (not shown) of the rear pump is delivered to a recessed chamber 205 in automatic valve 201, fluid from the front pump entering through a passage 219 and passing first through a channel 212 in the manual valve. Such valve channel is so positioned as to close off escape of fluid from the rear pump when the manual valve is shifted to neutral position, although, of course, with the transmission in neutral no fluid flows from the rear pump unless the vehicle is coasting or the driven shaft is otherwise turned. Assuming for the present purposes that the manual valve is in its highest position, as shown in Figure 11, the progressive action of the automatic valve 201 commences with the latter in its lowest position.

With the automatic valve in this position, fluid enters valve chamber 205 from both pumps, as previously described, and can escape from this chamber only through passages 209E and 211C. Continuations (209e, 211c) of these passages lead to the pressure chambers 78, 168 for the clutches E and C, respectively, through distributing means presently to be described. As previously stated, operation of the transmission in first speed requires engagement of clutches A, C, and E, so that first speed operation is then effected, as soon as main clutch A is engaged by its operating means previously described. It will be noted that the manual valve 204 is also in series with the passages 209E, 211C, and arranged to enable interrupting the communication. With the manual valve in its raised "4TH" position, however, valve channels 209X, 211X therein provide "straight through" communication without interfering with operation of the clutches in question.

If, with the manual valve remaining in the elevated position, the automatic valve 201 is raised, by its operating means previously described, to the position designated "2ND" in Figure 11, communication is also established with passage 210F, without interrupting communication with passages 209E, 211C. Passage 210F, through its continuation 210f, is in communication with the pressure chamber 86 of brake F, when such communication is not cut off by the interposed manual valve, which is provided with an appropriately positioned "straight through" channel 210X. With the automatic valve thus raised to "2ND" position, clutches C, E, and brake F are engaged, and clutch A now becomes locked in engagement (in a manner presently to be described) as required for second speed operation.

Third speed becomes effective when valve 201 is lifted to the position designated "3RD" in Figure 11. The valve 201 will be seen to be so designed that this cuts off port 211C and establishes communication with passage 206B, whose continuation 206b communicates with pressure chamber of clutch B, through the interposed channel 206X of the manual valve. Thus the clutches A, B, E, and brake F may be concurrently engaged, as required for third speed operation.

Similarly, the next upward step of the automatic valve, induced by the actuating plunger 179, carries it to the "4TH" position, in which ports 211C and 209E are both cut off, and communication is established with port 208D. The continuation portion 208d of the last mentioned port is in communication with the pressure chamber 77 for actuation of clutch D, through the opening 208X in the manual valve 204. Thus it will be seen that clutches A, B, D, and F may be concurrently engaged, as required for fourth speed operation.

In normal automatic operation of the transmission, valve 204 remains up in the "4TH" position, and the automatic valve 201 moves up and down through the several positions just described, under the influence of its actuating means, which then controls the operation of the automatic clutches B, C, D, E, and brake F, which control the ratio changes in the manner also already described. The clutch A constitutes a simple and highly efficient automatic main clutch which engages smoothly as the engine speed is increased by opening the throttle to speed up the engine to a predetermined rate, but it will be apparent that the main clutch might be operable manually or otherwise, rather than automatically.

The passages 208d, 209e, 211c, and 206b extend and are connected individually to the several chambers 306, 307, 308, and 309 of a distributing manifold 55 (Figure 2—A) these channels being individually connected by means of elongated recesses such as 310 in sleeve bearing 20, and by longitudinal holes (also undesignated) drilled in the shaft 100, to the pressure chambers of transmission clutches B, C, D and E.

Brake F is not supplied through the manifold 55. Instead its passage 210f is extended through the cap 64 of pump 62 and conducts the fluid through a port 228 to a recessed chamber 229 in the valve 230, which is separately illustrated in Figures 7 and 7A. From this chamber the fluid is conducted to brake F through a port 241 and tube 242, the latter communicating with a fitting 227 opening into the pressure chamber 86 of this brake.

The functioning of the valve 230 will presently be described. This valve and the other valves and releated elements shown in Figures 5 and 6 are carried by and housed in a casing and support 41 formed also to house the forward pump 62 and as a unit with the web 139.

In the passages leading to clutches B, C, D and brake F, ball check valves are inserted, as at 79 (Figure 2C), which close toward the pressure chambers but allow a metered flow when closed, to feed the fluid to these clutches at a predetermined rate when the valve is seated. This will be seen to control the time required for engagement of these clutches, making them engage smoothly and preventing jerking of the vehicle, while the check valve opens fully in the opposite direction, to allow quick disengagement. The check valves for the other clutches (B, C and E) are not illustrated.

Figure 7A:
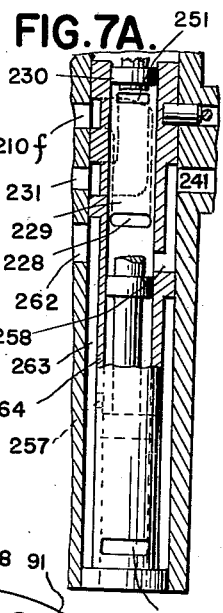
Figure 7 is a similar sectional detail of one of the valves.

Before passing to the distributing chamber 205 through passages and orifices 219, 212, and 98, the fluid from the front pump 62 is delivered, under pressure, through a port 262 to a circular recess chamber 263 in the sleeve 264 surrounding valve 230 (Figures 7 and 7A). Valve 230 is situated in a bore directly forward of and closely adjacent the vertically disposed axially aligned relief valves 213 and 214. From the chamber 263 the fluid passes to the chamber of the relief valve 213 through a connecting port 215. The position of connecting port or passage 215 is indicated in Figures 5 and 7—A. The pressure fluid urges the relief valve 213 against the tension of a relief spring 216 far enough to escape from the side ports 217–218 in the sleeve at a predetermined maximum pressure. The fluid delivered through port 217 is conducted through the conduit bore 219 and passage 212 in the valve 204 to the chamber 205 of valve 201. Fluid passing through port 218 is conducted through a bore 220 and connecting passages (unshown) to a recess 221 in the pump body (Figure 2—A) whence it is conducted to the conduit bore 145 for operating main clutch A. The fluid is also conducted to the second relief valve 214 by a passage 222, which communicates with the passage 220 and with a port 223. The relief valve 214 is also opposed by the opposite end of the spring 216, and a predetermined pressure permits escape of a part of the fluid through a passage 224 and the remainder through the escape port 225. The fluid from passage 224 flows through a circular chamber 226 surrounding the shaft (Figure 2—A) and a passage 226A, which connects with one of the conduit bores in the shaft 100, from which it is distributed to various points for lubrication and to fill the clutch pressure balancing chamber 167 for clutches B and C.

Pressure fluid for maintaining engagement of the main clutch A after the vehicle has been shifted into second speed, and while it is in this and higher speeds, is taken from the recessed chamber 229 in valve 230, which is supplied, through the main control valve system 201, 204 when these valves are so set as to call for operation of the transmission in second or higher gear ratio. From chamber 229 the fluid passes through a port 251 and a connected passage 231, (Figures 5 and 7A), annular recess 233 (Figure 2A) and through the sleeve 137 to the conduit bore 159 and valve 158 (Figure 3).

Manual ratio control means

Referring to Figure 5, a lever 234 operable from outside the casing is provided, and may be connected to a suitable pedal (unshown), which, in automotive installations may be arranged at a point convenient to the operator's left foot. This is adapted by means presently to be described to control the operation of the main clutch manually whenever the operator so desires.

Another lever 235 also operable from outside the casing may be connected by suitable linkage (unshown) or other means to a second manual controlling device, which may comprise, in automotive installations, a plunger or small lever on the instrument panel or steering column. This is arranged to provide manual control or manipulation of the speed changes and of the neutral and reverse settings, and to enable the operator to overcontrol the automatic action by moving the manual valve 204.

Lever 235 is fixed to a sleeve 236 which extends a short distance into the transmission housing where it carries a crank 88 having a ball end engaging in the bore of a bushing 237 carried by a bell-crank 238 which is actuated thereby, the bell-crank being pivoted on a stud 239. This bell-crank, as will be seen, is adapted to slide the valve 204 to various positions, defined by a plurality of spring ball detent recesses 240.

The valve 204 is shown in Figures 5 and 11 in the position at which the transmission would automatically shift upwardly through its several speeds at the predetermined velocities. If, by means of the described manually controlled linkage the valve 204 is moved progressively downward to each of the different recesses, the transmission speeds will be changed from fourth to third to second to first to neutral and then to reverse in the order stated. Whichever such detent position the valve 204 is set back to, the transmission will automatically shift up to, but no higher. For example, if the valve be set back one detent position, the transmission will automatically shift up to third speed but not to fourth, while if it were running in fourth speed, movement of the valve back one such position would immediately change to third speed without requiring any other action on the part of the operator.

Movement of the valve 204 requires no change in the automatically selected position of the valve 201 to perform its function, excepting that the transmission speeds cannot thereby be brought above the highest selected by the automatic valve, but can be lowered. This, however, applies only to manual changing of the speeds through the forward range and neutral, but not reverse. If it is not desired to operate the transmission automatically through the automatic system described, this valve alone is adapted to manually effectuate the speed changes as desired.

The downward movements of the manual valve 204 to the several positions mentioned are progressively shown in diagrammatic Figures 12 to 16 inclusive. With the manual valve dropped one notch, to the "3RD" position, as shown in Figure 12, port 208D is cut off, but since ports 208D, 206B, 210F, and valve chambers 208X, 206X, and 210X are all equally spaced, valve passage 208X then serves to connect passages 206B, 206b, and valve passage 206X connects passages 210F, 210f. It will be noted that although passage 209E is cut off by valve 204, the supply to clutch E is maintained through a bridging slot 200 cut in the valve upon its edge which passes over the ports 219, 209e, 211c. Slot 200 intersects slot 212, which provides communication with chamber 205 through passage 98, and a connecting channel 94 which encircles a part of the sleeve surrounding valve 204. When the valve 204 is in "3RD" position, slot 200 connects passage 219 directly to the passage 209e leading to clutch E, while slot 212 and passages 94, 98 also provide connection to the chamber 205. Valve channel 209X then also connects passages 211C, 211c, so that it is also still possible to engage clutch C, if the automatic valve is dropped to second speed position while the manual valve remains in third speed position. Pressure chamber 77 of clutch D is also vented by a slot 95 formed in the side of valve 204 near the top and serving to progressively connect passages 208d, 206b, 210f to atmosphere as the valve is moved downward. In the "3RD" position, disengagement of clutch D (used only in 4th) is effected in this manner. It will also be appreciated that with the manual valve in the third speed position, automatic valve 201 may be dropped to first speed position, cutting off brake F but maintaining engagement of clutches C and E, as required for first speed operation.

Upon movement of the manual valve down still farther, to the second speed position shown in Figure 13, clutches D and B are both disengaged by venting of their pressure chambers through side slot 95 of valve 204, while energization of brake F is still possible by reason of the fact that valve passage 208X then connects passages 210F, 210f. Clutches E and C are then both supplied through slot 200 in valve 204, which provides connection between their feed passages 209e, 211c and the fluid pressure supply. The automatic valve 201 then functions in either first or second position, but is not effective in higher positions, as will be apparent.

Figure 14 shows the manual valve moved down another predetermined distance, to the first speed position, designated "1ST". Clutches B, D, and brake F are then all deenergized, by connection of their feed passages to atmosphere by slot 95 of the manual valve, since these are not used in first speed. The feed to clutches C and E is maintained through slot 200 in the manner previously described, and since in first speed only these clutches are used, in conjunction with the main clutch A, first speed remains effective, but the automatic valve cannot cause engagement of a higher gear ratio.

Positive maintenance of the transmission in neutral condition is effected by moving the manual valve down one position farther, to the point, indicated in Figure 15, where all of the transmission clutches are disengaged due to disconnection by the manual valve and venting through the slots 95 and 200, which, as shown in the view in question, then connect all of the feed passages 208d, 206b, 210f, 209e and 211c to atmosphere. At this time the clutches are disconnected from the pressure fluid supply from both pumps, and the feed from the front pump through bore 219 is also vented to atmosphere by slot 200.

When the manual valve 204 is in the neutral position, the pressure from the front pump being vented from its lower end, as stated, is exhausted from passage 219 and cannot reach passage 220 and through it the pressure chamber 33. The main clutch is therefore disengaged, or prevented from engaging, and the driving connection from the engine broken.

Reverse operation

For reverse to become effective when the manual valve 204 has been moved down to such position (shown in Figure 16), the vehicle must be traveling slowly enough so that the automatic valve 201 is in the first speed "1ST" position. The pressure fluid for operating the reverse cylinder 99, and the clutches B and C when in reverse, is supplied from chamber 205 through an outlet passage 92 which connects therewith at the extreme lower end, so that the pressure fluid can only reach it when the automatic valve is in its lowermost position. Passage 92 terminates in a port 82 at the manual valve. Other ports at the same level form connections with connecting passages 84B, 85C, which lead, respectively, to the feed passages 206b, 211c. Another port, also at the same level, leads to the passage 243 and connecting conduit 244, which communicates with a fitting 244' in the cylinder 99 (Figure 8). When the manual valve is in the reverse position, the chamber 210X therein connects all of these ports, so that fluid from the front pump is then delivered from chamber 205 through passage 92 and the ports in question to clutches B and C and to cylinder 99 (whose function will presently be explained), as required for reverse operation. Small closing bridges 71, 72, are so carried by the manual valve, extending across the slots 95, 200, respectively, that when this valve is in the reverse position they cover the feed passages 206b, 211c, and prevent venting of the pressure chambers of clutches B and C, which may thus be energized by pressure fluid delivered thereto through passages 84B, 85C, as previously stated. Only clutches B and C being employed, in conjunction with main clutch A, for reverse operation, the other transmission clutches are maintained in the deenergized condition by the manual valve when in the reverse position, but the fluid from the front pump is then delivered to the chamber 205 through chamber 87 in the manual valve.

Since the valve 201 is moved only by the pressure fluid from the rear pump 63, this valve will not be moved out of its low gear position while the vehicle is in reverse as in such case the rear pump is also running backwards and therefore supplying no fluid pressure. A further safeguard, which is effective when shifting back and forth through neutral to forward and reverse is also provided and will be described later.

It will be noted that in reverse operation clutches D and E are deenergized. As previously stated, for reverse drive to become effective, it is necessary to reverse the action of overrunning clutch 111 and to free the sections of overrunning clutch 130 for independent rotation. Pressure cylinders 107 (Figure 9) control the action of overrunning clutch 130. These pressure cylinders are supplied with fluid concurrently with clutches D and E and are subjected to pressure when either clutch is engaged, but to no pressure when both clutches D and E are disengaged. During reverse operation, therefore, cylinders 107 are deenergized and springs 93 of the operating mechanism for overrunning clutch 130, (best shown in Figures 9 and 10) then turn the ring 128 counterclockwise, as viewed in Figure 9. Ring 128 is rotatably mounted in the inner or cam portion 122 of overrunning clutch 130, and carries lugs 129 projecting from one face for engagement by the stems of pistons 127 and is also slotted at 91 to receive springs 121 which normally act to urge the cage 123 toward wedged position, bearing against lugs 124 carried by a plate 120 attached to the cage. The housing 125 in which the cylinders are formed is keyed as at 126 to the cam 122, and floats on the shaft, being connected through appropriately positioned radial channels (undesignated) with the internal passages feeding clutches D and E, one cylinder being connected to the passage feeding clutch D, and the other to the passage feeding clutch E. When either clutch is energized, the springs 95 are compressed, and ring 128 is then turned to and held in such a position, by pistons 127, that springs 121 are effective to operatively urge the cage 123 toward the wedging position. When both clutches D and E are deenergized, however, springs 93 move the ring 128 counterclockwise sufficiently so that the ends of slots 91, in which springs 121 are mounted, engage the lugs 124 and so move the cage to an inoperative position in which the rolls are freed, as by alignment with suitable depressions 106 in the cam. The overrunning clutch thus functions whenever either clutch D or E is engaged, but is completely released and its parts rendered freely rotatable, in the manner previously described as necessary for reverse operation, when the transmission is in reverse and both clutches D and E disengaged.

In order to reverse the operation of overrunning clutch 111, as is also necessary for reverse operation, its cage 101 is attached to a plate 102 having an integral arm 103 projecting therefrom and operable by the piston 97 which is fitted in cylinder 99. Arm 103 extends into an opening (undesignated) in the piston rod 96 and between spring-pressed plungers 105 which serve to yieldably hold the cage in either position to which it may be moved by the piston.

The rollers 108 cooperate with flattened surfaces of the cam 144, having a wedging position at each end of such surfaces and being free when near the middle thereof. The rolls are yieldably urged toward one end of the flats by a spring 104 when the fluid pressure is not applied to the piston 97. The overrunning clutch then functions in the direction necessary for forward drive. When pressure is exerted, however, it holds the piston rod and so the arm 103 in such position as to compress the spring 104 and yieldably maintain the rolls in the opposite position necessary for reverse operation.

The fluid inlet 244' of cylinder 99 is connected by the conduit 244 with reverse feed passage 243 (Figure 16). Whenever manually operable valve 204 is shifted to reverse position, fluid is delivered to passage 244, provided the automatic valve 201 is in its lowest (first speed) position, as previously described. Piston 97 is then moved by the fluid pressure to shift the cage of the overrunning clutch to the position for reverse operation.

*Manual control of main clutch*

The lever 234 is fixed to a cross shaft 245 which extends across the transmission through the hollow shaft 236, carrying within the transmission casing a lever 246 having a ball end engaging a suitable socket in a lever 248 to actuate the same. Lever 248 is pivoted with lever 238 upon stud 239. The end of lever 248 engages a yoke 249 fixed to the upper end of the stem of valve 230 and also extending over the end of plunger 250, to actuate the valve and plunger simultaneously. It should be noted that while Figure 7 comprises a section of valve 230 on a transverse plane, the yoke or connector 249 is shown, together with stem 250, turned 90° from their actual position, for clarity of illustration.

The automatic second speed lock-in for the main clutch must be rendered inoperative before such clutch can be controlled manually. This is one of the functions of the valve 230. Upon the first slight depression of the pedal controlling movement of the lever 248, the latter is moved down sufficiently to carry the valve 230 down to a point which cuts off port 251 in the sleeve of the valve 230. Port 251 is that through which pressure fluid is supplied to port 231 and hence to the valve 158 (Figure 3). This pressure source being cut off, the main clutch cannot be held in engagement by the supplementary holding means provided by the valve 158, and the clutch may be manually controlled through the primary fluid pressure source. Since the upper portion of valve 230 is reduced in diameter, port 251 is connected to atmosphere to vent pressure chamber 160 as soon as the upper end wall of the valve has moved downwardly far enough.

Since the determination and maintenance of fluid pressure in piston chamber 33 is dependent upon the relief valve if centrifugal effect has closed the port 155 of valve 146, means is provided to reduce gradually the effective tension of spring 216 which tends to close the relief valve. This will be seen to conformably reduce the pressure in chamber 33 which provides the clutch engaging pressure. Such means comprises a smaller spring 252 arranged inside the valve 214, which is hollow. The plunger 250 abuts one end of the spring 252 projecting slidably through the hole in the end of the relief valve. As the plunger 250 is depressed more and more by downward movement of the lever 248, the spring 252 opposes the tension of spring 216 with increasingly greater effect until a point is reached where it completely overcomes the latter and permits the pressure fluid to be freely vented to atmosphere through the port 225, thus releasing the main clutch by completely relieving the operating pressure from passage 220 and chamber 33.

The main clutch may be manually operated at various pressures or completely released at will at any time in this manner, provided the engine speed is sufficient so that the centrifugal control elements maintain an effective pressure. In other words, engagement of this clutch is always primarily dependent upon centrifugal action, but the operator is provided with means for releasing or controlling the clutch manually at any speed beyond that of the normal engagement.

Neutral safety lock

Since the valve 204 may by means of its operating plunger or lever be moved with very little effort on the part of the operator, it is deemed advisable (since the engine may be speeded up to a point where the centrifugally controlled main clutch is ready for instant engagement) to provide some means to prevent the operator from shifting into forward or reverse without first depressing and holding down the clutch control pedal to its fully released position. Such safeguard is provided in the form of a spring pressed plunger 253, only the end of which appears in Figure 5. One end of the plunger becomes engaged in a hole 254 in the bellcrank 238, whenever the latter is moved to its neutral position. A pin 256 carried by plunger 253 is engageable by a lever arm 255 fixed to the cross shaft in such manner that when the shaft is rocked in the direction which results in deenergizing the main clutch, the plunger is withdrawn, to again permit the bellcrank 238 to move out of neutral or through neutral to either forward or reverse. These parts are so arranged that the clutch controlling pedal must be fully depressed to rotate shaft 245 sufficiently to move the plunger 253 clear of the hole 254.

Hill-holding means

In the transmission as shown, the parts are also so arranged that merely by holding the clutch pedal fully depressed, and shaft 245 rocked to the clutch-released position, hill-holding means is rendered effective to prevent the car from rolling backward when the transmission is in a forward gear, and likewise to prevent the car from rolling forward when the transmission is in reverse gear. Since the clutch operating pedal may be made to work against extremely light pressure, this hill-holding means, although not automatic, may be maintained in effect, even for relatively long periods of time, without fatigue. In my preferred arrangement the mere weight of the foot is sufficient to operate the pedal.

The means in question provides for maintaining engagement of brake F while the vehicle is stationary. To accomplish this, a port 257 in the valve sleeve 264 (Figure 7) communicates with the pressure fluid chamber 263 of valve 230, which receives the output from the front pump, as previously stated, in such manner that when the valve 230 is moved down to its bottom position, this port communicates with the recessed chamber 229, which chamber at this time is also still in registry with the port 258 leading to the passage 241, supplying the pressure fluid to brake F. This will be seen to shunt pressure fluid from the front pump directly to the pressure chamber of brake F, to fully engage it. At this time the port 228 is closed by the upper wall of the valve, to prevent escape of fluid therethrough.

Since the main clutch controlling pedal must be fully depressed to released position to effect this condition, it will be seen that no driving torque is being applied to the transmission at such time, the engine being disconnected, as it should be under such circumstances. With brake F engaged in this manner, and the main clutch disengaged, the sun gear 70 is held stationary with respect to the transmission casing. If the transmission is then shifted to or is in any of the forward speeds, ring gear 90 cannot turn in the opposite direction, because the outer race of overrunning brake 111 will not turn in such direction, and the planet gears 80 cannot drive the sun gear forward. Similarly, if the shift is in reverse, the overrunning clutch 111 is locked in the other direction, and the ring gear 90 therefore cannot turn forward. In both of these instances however, the vehicle can coast freely in the direction in which the shift is set. Therefore, if the brake F is so engaged by depression of the main clutch control pedal with the vehicle moving in either direction, no harm will be done and no effect will be noticed, as the disengagement of the main clutch allows the other parts of the transmission to become stationary or revolve with the shaft 100, irrespective of the stationary condition of the sun gear.

In neutral the hill-holding means is not effective because the pressure from the front pump is being vented as previously explained.

Dual pump system

Because of the use of two separate pumps in the manner described, one operated by the engine and the other by the driven shaft, means must be provided to prevent losing the pressure from one pump through the other, when one is not running. For this purpose each pump is provided with a relief valve such as that shown at 213 (Figure 5). The conduit ports, as 217, of these valves are closed by the valve plungers whenever fluid is not supplied to them under sufficient pressure by their respective pumps to overcome the springs.

The main outlet of rear pump 63 is connected by the conduit and passageway 259 to the valve body 41 at the front of the transmission adjacent the forward fluid pump 62, whereby the pressure fluid from the rear pump is also delivered to chamber 205 of valve 201. By reason of this arrangement, if the car were being towed or coasting without the engine running, and with the front pump idle, the pressure fluid from the rear pump, unless port 217 were closed by the relief valve, would flow out through the port 215 and back through the front pump, where it would be vented to atmosphere through the fluid intake. With the port 217 closed by the relief valve, however, this cannot occur, and pressure from the rear pump is therefore maintained in the system.

Similarly, when the front pump 62 is operating and the rear pump 63 is idle, the pressure fluid entering the recessed chamber 205 would escape through the conduits and tube 259 and the rear pump 63 were it not for the fact that the conduit 259 discharges at the rear pump relief valve (unshown) in the same manner as the passage 219 and the port 217 at the front valve. This provision is especially important in connection with the rear pump for the reason that this is always idle until the vehicle is actually under way, and also because the pressure of the fluid delivered by the rear pump system varies in predetermined steps. The pressure of the fluid is not great enough to open the relief valve of the rear pump until it has attained a speed sufficient to produce a greater volume than can escape through the auxiliary port 170, or until the speed of the governor is high enough to close the last escape port therein.

Pressure fluid is also taken through a branch passageway (not shown) connected with conduit 259 at a point forward of the rear pump relief valve, to a circular recess 261 in the rotor of the rear pump. The pump being of the sliding vane eccentric stator type, this pressure fluid is arranged to urge the vanes outwardly, effectively holding them in engagement with the stator, even at low speeds, by means of pressure fluid delivered from he front pump.

Starting engine by towing vehicle

To enable starting or turning over the engine by pushing or towing the vehicle, it is only necessary to set the shift valve in either the third or fourth speed position, and then to tow or push the vehicle until a speed is reached at which the automatic shifting valve is moved to third or fourth speed position. At this speed of the propeller shaft, the rear pump delivers sufficient pressure fluid to the valve chamber 205 to energize the main clutch, the fluid being transmitted just as if coming from the front pump, through the conduits and passages previously described, to the valve 158.

When it is desired to start the engine by towing the vehicle, clutch A being disengaged, only rear pump rotor 163 is driven, by rotation of the driven shaft, and this fluid pressure, when the vehicle attains a speed at which the shift occurs to second gear or higher, is admitted to the conduit 159. Upon movement of the valve 158 all the way to the left, as viewed in Figure 3, the full fluid pressure is admitted to the piston chamber 33, through port 161, thereby establishing engagement of the main clutch to rotate the flywheel.

Lubrication

To provide for forced feed lubrication of the various elements, even when the vehicle is being otwed in neutral for any appreciable distance, one of the ports 74 of valve 204 is so positioned that when this valve is in neutral position, pressure fluid from the rear pump only, entering valve chamber 205 communicates through 210X with a passage 260 which in turn communicates with the space 226 (Figure 2—A) between the front pump and transmission bearing, for lubrication through the lubricating channels previously described.

With the engine running and the shift in neutral, the front pump is cut off at 94, but no forced feed lubrication is necessary, as the only turning part in contact with another is the sleeve 137, which is lubricated sufficiently by seepage from the rotor of the front pump.

What I claim is:

1. In an automatic transmission including driving and driven elements, torque converting means providing potential driving connections between said elements at different ratios, and a pair of fluid actuable friction clutches for controlling said driving connections, said clutches being substantially axially aligned and having separate actuating pressure chambers spaced from each other, each of said pressure chambers being defined by a fixed piston and a movable cylinder operatively engaging the same, said cylinders having juxtaposed head walls, and means enclosing the space between said head walls and defining a third pressure chamber contractible and expansible with opposite movement of said cylinders toward and from each other, and means for introducing fluid into each of said pressure chambers, whereby fluid in said third pressure cylinder tends to move said cylinders apart and to simultaneously oppose the force of fluid in both of said two first-mentioned pressure chambers.

2. Means as set forth in claim 1 in which movement of either of said cylinders toward the other tends to engage its clutch, and such movement decreases the volume of the third pressure cylinder, all of said cylinders being rotatable, whereby fluid in the third pressure cylinder tends to maintain both of said clutches disengaged to counterbalance centrifugal forces developed by fluid in the two first mentioned pressure chambers.

3. In an automatic transmission, in combination with driving and driven elements, means potentially providing a plurality of driving connections between said elements at different relative torque ratios, means for controlling the action of said driving connections, including a plurality of fluid actuable friction clutches, one thereof being arranged as a main clutch to break the driving connection between the driving element and the remainder of the apparatus, and the other clutches controlling such driving connections to change the torque ratio, means for actuating said clutches including a source of fluid pressure and plurality of pressure chambers, means for selectively applying fluid pressure to said pressure chambers to actuate said clutches, means responsive to the rate of rotation of the driving element for controlling the fluid pressure delivered to the pressure chamber for actuation of the main clutch, and means responsive to the rate of rotation of the driven shaft for controlling the fluid pressure applied to actuation of the other clutches.

4. In automatic transmission in combination with driving and driven elements, torque-varying means for changing the driving ratio between said elements, a main clutch arranged between said driving element and torque-varying means, and a plurality of clutches for controlling the action of said torque-varying means, each having fluid-operable actuating means, means responsive to the speed of the driving element for engaging said main clutch, and means responsive to the speed of the driven element for controlling the action of said other clutches, including a source of fluid pressure supply at a predetermined maximum pressure, a plurality of relief valve means for varying the effective pressure of the fluid delivered from said source to the fluid operable actuating means for the clutches, and centrifugal means responsive to the rate of rotation of the driven shaft for controlling said relief valve means.

5. Means as set forth in claim 4 in which said relief valve means comprise a plurality of separate pressure relief valves progressively actuable by variant forces developed by said centrifugal means and acting to delimit the resultant actuating fluid pressure delivered to said actuating means for the clutches.

6. Means as set forth in claim 4 in which said relief valve means comprise a plurality of separate pressure relief valves progressively actuable by variant forces developed by said centrifugal means and acting to delimit the resultant actuating fluid pressure delivered to said actuating means for the clutches, and means also actuable by said centrifugal means in response to increase of centrifugal force and closing off the fluid flow to a relief valve actuable by lower fluid pressure.

7. In an automatic transmission, in combination with driving and driven elements, a plurality of torque-transmitting means potentially providing driving connections between said elements at different torque ratios, a main clutch for connecting and disconnecting the driving element with respect to said torque-transmitting means, a plurality of fluid-operable clutches for controlling the action of said torque-transmitting means, and means for selectively actuating said clutches, including in combination with a source of fluid under pressure, a valve responsive to changes of fluid pressure, and means for varying the pressure of the fluid from said source including a plurality of pressure operable relief valves having different resistances arranged to be supplied with fluid simultaneously with said valve responsive to changes of fluid pressure, and centrifugal means for controlling the action of said relief valves.

8. In an automatic transmission, in combination with driving and driven elements, a plurality of torque-transmitting means potentially providing driving connections between said elements at different torque ratios, a plurality of fluid-operable clutches for controlling the action of said torque-transmitting means, and means for selectively actuating said clutches, including in combination a source of fluid under pressure connectible to said clutches to actuate the same, means for varying the effective pressure of the fluid from said source to control the actuation of said clutches, including a pressure-responsive relief valve, and means responsive to the rate of rotation of one of said elements to control the action of said relief valve.

9. In an automatic transmission, in combination with driving and driven elements, a plurality of torque-transmitting means potentially providing driving connections between said elements at different torque ratios, a plurality of clutches for controlling the action of said torque-transmitting means, fluid operable means responsive to pressure changes for actuating said clutches, a source of fluid under pressure connectible to said actuating means to operate said clutches, means for varying the fluid pressure to control actuation of said clutches by said actuating means, comprising a pressure-responsive relief valve, and means responsive to the rate of rotation of one of said elements to control the action of said relief valve.

10. In an automatic transmission, in combination with driving and driven elements, a plurality of torque-transmitting means potentially providing driving connections between said elements different torque ratios, a plurality of clutches for controlling the action of said torque-transmitting means, fluid-operable means responsive to pressure changes for actuating said clutches, a source of fluid under pressure connectible to said actuating means to operate said clutches, means for varying the fluid pressure to control actuation of said clutches by said actuating means, comprising a plurality of pressure-relief valves connected in parallel to said source of fluid under pressure and operable progressively by variant fluid pressures, and means responsive to the rate of rotation of one of said elements to control the action of said valves.

11. In an automatic transmission incorporating a plurality of fluid-operable devices for controlling the operation of a plurality of forward speeds and for controlling the operation of a reverse speed, an overrunning clutch in the line of drive, actuating means for said devices arranged to deliver fluid to different ones thereof to control the operation of the several speeds, fluid-operable means for changing the direction of operation of said overrunning clutch, and means responsive to delivery of fluid to the device for rendering reverse speed effective for directing fluid to said fluid operable means for changing the direction of operation of the overrunning clutch.

12. In an automatic transmission incorporating a plurality of fluid-operable means for operating a plurality of forward drives and a reverse drive, an overrunning clutch in the line of both forward and reverse drives, fluid control means for operating said means arranged to deliver fluid to different ones thereof to control the operation of the several drives, fluid operable means for shifting a portion of said overrunning clutch to change the direction of operation thereof, said last mentioned fluid operable means being connected to and operable only with said means for controlling the operation of the reverse drive.

13. In a clutch and transmission construction for automotive and like uses, in combination with driving and driven elements, a main clutch, transmission mechanism, means for operating said clutch to make and break a connection between the driving element and the transmission mechanism, an overrunning clutch arranged between at least a part of said transmission mechanism and the driven element, means normally preventing said overrunning clutch from functioning, and means rendering said last named means inoperative when said first named means is operated to disengage said main clutch, whereby said drive element is then allowed to overrun the transmission mechanism.

14. In a clutch and transmission construction for automotive and like uses, in combination with driving and driven elements, a main clutch, transmission mechanism, means for operating said clutch to make and break a connection between the driving element and the transmission mechanism, a one way brake adapted to prevent unwanted reverse rotation of the driven element, means normally preventing said one way brake from so acting, and means rendering said last named means ineffective when said first named means is operated to disengage the main clutch, whereby said driven element is then prevented from rotating in a reverse direction.

15. Means as set forth in claim 14 in which said transmission mechanism incorporates means for transmitting forward and reverse drives, and means for reversing the action of said one way brake when the change is made from forward to reverse drive and vice versa, whereby said driven element may be prevented from rotating in a reverse direction to that established by the transmission mechanism.

16. In an automatic transmission construction, in combination with a plurality of fluid operable speed ratio-controlling means and two sources of fluid under pressure, two valve means arranged at least partly in series for controlling the supply of fluid to said speed ratio controlling means, one of said valves being operable automatically and the other personally, the fluid from at least one of said sources being delivered first to the personally operable valve and passing through a portion thereof and then to the automatically operable valve, and the fluid for operation of said ratio-controlling means normally passing back from the personally operable valve through said automatically operable valve, said valves having a plurality of corresponding outlets, the personally operable valve also having inlet portions corresponding to the outlets of the automatically operable valve and connected thereto, whereby under desired conditions the fluid may pass unhindered from the automatically operable valve through the personally operable valve, said personally operable valve also having a portion for diverting a part of the fluid to one of said outlets before such fluid reaches the automatically operable valve.

17. Means as set forth in claim 16 in which said personally operable valve is also movable to a position to vent the fluid delivered thereto to prevent effective delivery thereof through the valves to said ratio-controlling means.

18. In an automatic transmission construction for changing the driving ratio between driving and driven portions, a plurality of fluid operable ratio controlling means, two sources of fluid under pressure, one controlled by the driving portion and the other by the driven portion, two valves acting cooperatively to control the delivery of fluid to said ratio controlling means, one of said sources delivering its fluid to each of said valves, said valves having a plurality of corresponding ports in series, the outlets from the second valve leading to said ratio-controlling means, whereby one valve may be moved to overcontrol the other, the fluid from at least one of said sources being delivered first to said second valve and normally passing through a portion thereof and then through the first valve and back through said corresponding ports of the second valve, said second valve being movable to short circuit the fluid delivered thereto directly to at least one of said outlets leading to the ratio controlling means, without allowing said fluid to pass through the first valve, said second valve also being movable to a venting position to prevent delivery of such fluid to said ratio controlling means.

19. Means as set forth in claim 18 in which the fluid delivered to the first valve is controlled by the driven portion and the fluid delivered to the second valve is controlled by the driving portion.

20. In combination with means as set forth in claim 18, means for automatically controlling the first valve, and personally operable means for actuating the second valve.

21. In combination with means as set forth in claim 18, means for automatically actuating the first valve, personally operable means for actuating the second valve, the fluid delivered to the first valve being controlled by the driven portion, and the fluid delivered to the second valve being controlled by the driving portion.

22. In combination with means as set forth in claim 18, means for automatically actuating the first valve, the outlets of said valve being connectible through the second valve with different ones of said ratio controlling means, personally operable means for actuating the second valve, said second valve having a passage through which fluid from the first valve may be delivered to a desired outlet when such second valve is in position to vent the fluid delivered thereto.

23. In combination with means as set forth in claim 18, means for automatically actuating the first valve, the outlets of said valve being connectible through the second valve with different ones of said ratio controlling means, personally operable means for actuating the second valve, whereby it may act to overcontrol the first valve, said second valve having a passage through which fluid from the first valve may be delivered to desired ones of the outlets of the second valve when such second valve is in position to vent such outlets, and check means for preventing venting of the fluid from such outlets through the second valve at such time.

24. In combination with means as set forth in claim 18, means for automatically actuating the first valve, the outlets of said valve being connectible through the second valve with different ones of said ratio controlling means, personally operable means for actuating the second valve, whereby it may act to overcontrol the first valve, said second valve having a passage through which fluid from the first valve may be delivered to desired ones of the outlets of the second valve when such second valve is in position to vent such outlets, and check means for preventing venting of the fluid from such outlets through the second valve at such time.

TRACY BROOKS TYLER.